Feb. 24, 1970  H. L. DOBRIKIN  3,497,267
IMPULSE BRAKE SYSTEM
Filed Sept. 23, 1968
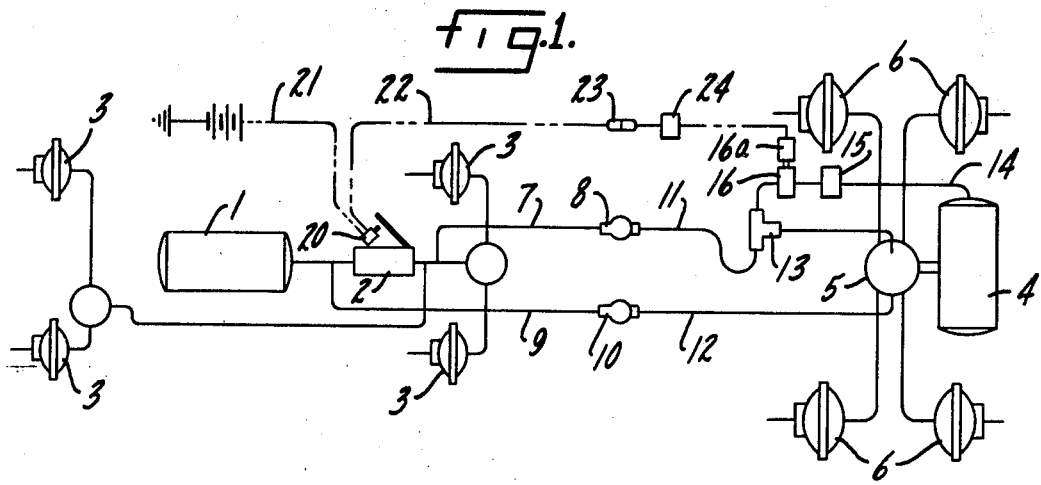
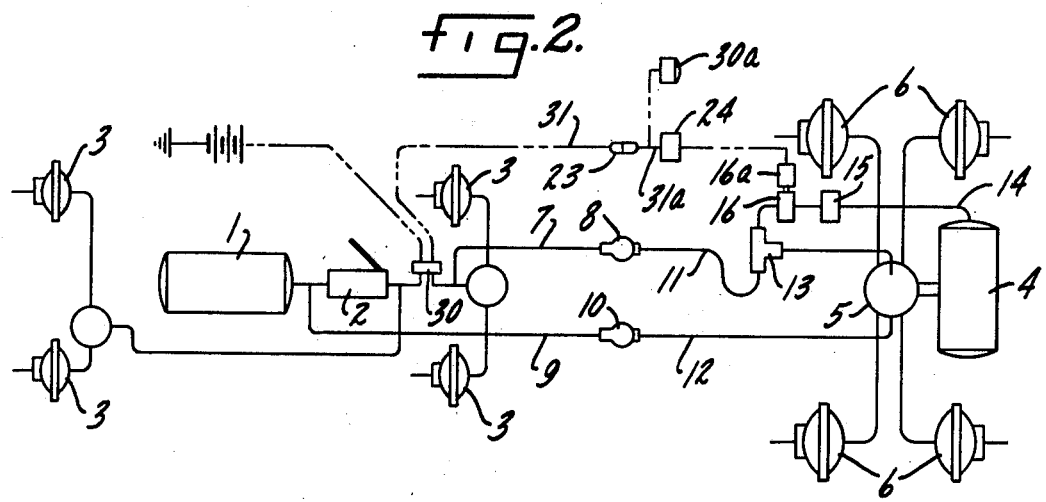
INVENTOR.
Harold L. Dobrikin
BY Parker, Carter & Markey
Attorneys.

United States Patent Office 3,497,267
Patented Feb. 24, 1970

3,497,267
IMPULSE BRAKE SYSTEM
Harold L. Dobrikin, Highland Park, Ill., assignor to Berg Mfg. & Sales Co., Des Plaines, Ill., a corporation of Illinois
Filed Sept. 23, 1968, Ser. No. 761,476
Int. Cl. B60t 13/74
U.S. Cl. 303—7        6 Claims

ABSTRACT OF THE DISCLOSURE

A brake system for tractor-trailer vehicles, wherein the operation of an application valve on the tractor produces an electrical signal on the trailer to supply a predetermined impulse of pressure to the trailer brakes.

SUMMARY OF THE INVENTION

The trailer brake system is provided with a pressure regulator between the trailer reservoir and the relay emergency valve, a solenoid valve between the pressure regulator and the relay emergency valve, a time delay controlling the solenoid valve and an electrical switch responsive to tractor brake application and effective to actuate the time delay. The electrical signal generator may be one or more microswitches responsive to operation of the tractor foot application valve or it may be the trailer stoplight switch which operates in response to the presence of fluid pressure in the tractor brake system as a result of application valve actuation.

This invention relates to tractor-trailer brake systems and has, as one of its purposes, the provision of means effective to reduce the tendency toward jackknifing in response to application of tractor brakes prior to application of trailer brakes.

Another purpose is to provide means which shall be of maximum simplicity and economy in construction and installation and which shall nonetheless be effective to substantially reduce or eliminate delay between the application of tractor and trailer brakes.

Another purpose is to provide a system effective to reduce or eliminate delay between the application of tractor and trailer brakes, which system shall not require revision or modification of, or addition to, present tractor systems.

Another purpose is to provide a system effective to reduce or eliminate delay between the application of tractor and trailer brakes and incorporating elements adjustable individually and in combination to produce a predetermined desired relationship between tractor and trailer brake application pressures and times.

Another purpose is to produce a system carried entirely on a trailer and effective to accelerate the application of trailer brakes in response to application of tractor brakes.

Other purposes may appear from time to time during the course of the specification and claims.

BRIEF DESCRIPTION OF THE DRAWINGS

The invention is illustrated more or less diagrammatically in the accompanying drawings wherein:

FIGURE 1 is a schematic view of one form of the invention; and

FIGURE 2 is a schematic view of another form of the invention.

Like parts are indicated by like numerals throughout the specification and drawings.

DESCRIPTION OF THE PREFERRED EMBODIMENT

Referring now to the drawings, and particularly to FIGURE 1, the tractor brake system is illustrated in the left-hand portion of the drawings. Such a system conventionally includes a pressure reservoir 1, a foot-operated brake application valve 2 and a plurality of tractor brake application cylinders 3.

Similarly, a conventional trailer brake system may include, as shown in the right-hand portion of the drawings, a trailer reservoir 4, a relay emergency valve 5 and a plurality of trailer brake application cylinders 6.

A service pressure line 7 extends from application valve 2 to a gladhand connector 8. An emergency pressure line 9 extends from reservoir 1 to a gladhand connector 10. The gladhand connectors 8, 10 are provided conventionally for connection with corresponding trailer service line 11 and emergency line 12, respectively. Emergency line 12 communicates with relay emergency valve 5.

In accordance with the invention, service line 11 communicates with a two-way check valve 13 which in turn has one of its ports communicating with relay emergency valve 5.

A pressure conduit or line 14 extends from trailer reservoir 4 to a pressure regulator 15, thence to a solenoid or other electrically operated valve 16 and thence to the third port of two-way check valve 13.

Indicated at 20 is a microswitch supplied with electrical energy by conductor 21. Microswitch 20, it will be realized, is positioned for operation in response to movement of the operating foot pedal of application valve 2. Conductor 22 delivers electrical energy from switch 20 through a suitable tractor-trailer electrical connection 23 to a time-delay or electrical relay 24 and thence to a solenoid 16a of solenoid valve 16.

Referring now to FIGURE 2, it will be observed that the microswitch 20, conductors 21, 22 and connector 23 have been eliminated and the conventional tractor-mounted stoplight switch 30 is connected by conventional conductor 31 to the trailer mounted stop-light 30a. In accordance with the invention, a branch conductor 31a connects switch 30 with time delay 24. Beyond the time-delay 24 the system illustrated in FIGURE 2 corresponds to that of FIGURE 1, the solenoid valve 16, solenoid 16a, pressure regulator 15, two-way check valve 13 remaining in the positional interrelationship described above with respect to FIGURE 1.

While a single pressure regulator and solenoid valve are illustrated, it will be understood that two or more pressure regulators and solenoid valves could be arranged in series and two microswitches or a single microswitch of the step-type could be provided for higher impulse pressures in the trailer brake system as higher signal pressures are called for by application valve 2 in order to substantially equalize build-up times and pressures in both the tractor and vehicle brake system.

It will also be understood that hand-operated emergency, dash control or similar valves effective to actuate the brake system may similarly be equipped and associated with the elements of the invention to achieve the results described herein.

The use and operation of the invention are as follows:

When the operator operates an application valve such as the valve 2, at some point in said operation the microswitch 20 will be actuated. It will be understood that the microswitch 20 can be set for actuation only after a minimum brake application posture is reached, i.e. only after the foot pedal of application valve 2 has been moved a predetermined distance, when it is desired that the system of the invention shall not operate during periods of very light brake application. When microswitch 20 is operated, an electrical signal is transmitted through conductors 21, 22 and connector 23 to the time-delay or relay 24. Relay 24 will deliver electrical energy to solenoid 16a over a predetermined period of time. Thus the solenoid valve 16 will be open for said predetermined period and fluid pressure will flow from reservoir 4 through pressure regulator 15 and two-way check valve 13 to the relay emergency valve 5 which, as is well-known, will deliver fluid pressure from reservoir 4 to the trailer brake-operating cylinders 6. It will be understood that the pressure regulator 15 is preset to deliver a predetermined pressure level from reservoir 4 to solenoid valve 16.

It will be realized that adjustment of relay 24 may be accomplished to vary the period of time during which fluid pressure will be delivered through valve 16 to relay emergency valve 5. Further, the pressure regulator 15 may be set to supply varying amounts of pressure. Thus the point at which microswitch 20 is actuated, the duration of the impulse supplied by relay 24 and the level of pressure supplied by regulator 15 may all be adjusted and compromised in relation to the transmission time from the application valve 2 through the service line 11 to the emergency relay valve 5 in order to produce the most desirable relationship between tractor brake application time and trailer brake application time.

Tests, for example, of a standard tractor-trailer brake system with and without the employment of the assembly of the invention produced the following results (time is in seconds):

|  | Without impulse system | | With impulse system | |
| --- | --- | --- | --- | --- |
|  | Tractor | Trailer | Tractor | Trailer |
| Pressure enters system | .03 | .24 | .02 | .05 |
| System filled | .14 | .42 | .14 | .17 |
| 50% brakes | .26 | .52 | .26 | .27 |
| 75% brakes | .32 | .57 | .31 | .33 |
| 90% brakes | .37 | .62 | .36 | .41 |

It will be observed that delivery of fluid pressure to the trailer with the system of the invention was greatly speeded. Tests with variable setting of relay 24, solenoid 16 and regulator 15 have resulted in application of trailer brakes prior to application of tractor brakes.

In the form of the invention illustrated in FIGURE 1, the tractor is equipped with a signal generator, such as the microswitch 20, and the tractor and trailer are supplied with mating elements of a connector 23. In such event, a trailer equipped with the trailer elements of the invention requires matching with a tractor equipped with corresponding tractor elements.

In the form of the invention illustrated in FIGURE 2, however, the trailer is provided with a pressure regulator 15, a solenoid valve 16 and relay 24. A branch conductor 31a connects the standard pressure-operated, tractor-mounted stoplight switch 30 with the relay 24. This form of the invention is thus carried entirely on the trailer and a trailer so equipped is connectable to and may be drawn by any standard tractor. The operation of the invention as illustrated in FIGURE 2 is identical with that of FIGURE 1, operation of an application valve 2 on the tractor being effective to actuate stoplight switch 30. The time delay or relay 24 and pressure regulator 15 may be adjusted, as indicated above, and the connection of conductor 31 with the stoplight switch 30 may be such as to provide for transmission of electrical energy when the stoplight switch 30 has moved a predetermined distance. It will be understood that the stoplight switch 30 will normally be of conventional construction and is a pressure-operated switch responsive to the delivery of fluid pressure to the trailer system as a result of the operation of application valve 2.

While the elements of the invention are shown for clarity in separate locations, it will be understood that said elements may variously be combined in a single housing without departing from the nature and scope of the invention.

The embodiments of the invention in which an exclusive property or privilege is claimed are defined as follows:

1. For use with a tractor-trailer brake system having a reservoir and a relay emergency valve on the trailer, a pressure conduit for communicating said reservoir with said relay emergency valve, a pressure regulator in said conduit between said reservoir and said relay emergency valve, an electrically-operated valve in said conduit between said pressure regulator and said relay emergency valve, an electrical time delay relay carried by said trailer for opening said electrically-operated valve for a predetermined period of time, and means electrically connected to said relay and responsive to operation of tractor brakes to actuate said relay.

2. The structure of claim 1 wherein said means includes a microswitch operable in response to actuation of a tractor brake application valve.

3. The structure of claim 1 wherein said means include a stoplight switch carried on said tractor and operable in response to pressure entering the tractor brake system.

4. The structure of claim 1 characterized by and including a two-way check valve having an outlet communicating with said relay valve, said conduit communicating said electrically operated valve with one of the inlets of said check valve, the other inlet of said check valve communicating with the tractor application valve.

5. For use with a trailer having a pressure reservoir and a brake relay valve, a pressure regulator communicating with said reservoir, an electrically-operated control valve communicating with said regulator and said relay valve, and means for operating said control valve to provide a predetermined impulse of pressure to said relay valve, including an electrical time delay relay connected to said control valve.

6. The structure of claim 5 wherein said trailer carries a stoplight and said time delay relay is electrically connected to the conductor of electrical energy to said stoplight.

References Cited

UNITED STATES PATENTS

| 2,571,885 | 10/1951 | Ingres | 303—8 |
| 3,010,768 | 11/1961 | Obrin | 303—7 |
| 3,117,822 | 1/1964 | Blair | 303—7 |
| 3,232,674 | 2/1966 | Stelzer | 303—7 |
| 3,428,368 | 2/1969 | Kobnick | 303—3 X |

MILTON BUCHLER, Primary Examiner

JOHN J. McLAUGHLIN, Jr., Assistant Examiner

U.S. Cl. X.R.

188—3; 303—3, 15